US009653121B1

United States Patent
Chu et al.

(10) Patent No.: US 9,653,121 B1
(45) Date of Patent: May 16, 2017

(54) HEAT-ASSISTED MAGNETIC RECORDING DEVICE CAPABLE OF DETECTING HEAD MALFUNCTION BASED ON DIFFERENT CURRENTS OF SENSORS

(71) Applicant: Seagate Technology LLC, Cupertino, CA (US)

(72) Inventors: Alfredo Sam Chu, Prior Lake, MN (US); Wenzhong Zhu, Apple Valley, MN (US); Tim Rausch, Farmington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/073,774

(22) Filed: Mar. 18, 2016

(51) Int. Cl.
| | |
|---|---|
| G11B 11/00 | (2006.01) |
| G11B 27/36 | (2006.01) |
| G11B 20/10 | (2006.01) |
| G11B 5/00 | (2006.01) |
| G11B 11/105 | (2006.01) |
| G11B 7/1263 | (2012.01) |
| G11B 7/126 | (2012.01) |
| G11B 7/1387 | (2012.01) |

(52) U.S. Cl.
CPC ........ *G11B 27/36* (2013.01); *G11B 20/10037* (2013.01); *G11B 7/126* (2013.01); *G11B 7/1263* (2013.01); *G11B 7/1387* (2013.01); *G11B 11/105* (2013.01); *G11B 11/10534* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,349,007 B1* | 2/2002 | Jiang | G11B 5/02 360/31 |
| 8,391,107 B2 | 3/2013 | Gage et al. | |
| 8,842,383 B1 | 9/2014 | Balamane et al. | |
| 9,153,276 B2 | 10/2015 | Johnson et al. | |
| 9,318,153 B2* | 4/2016 | Trantham | G11B 5/314 369/13.24 |
| 2002/0186490 A1* | 12/2002 | Jiang | G11B 5/012 360/60 |
| 2009/0225464 A1 | 9/2009 | Juang et al. | |
| 2010/0122118 A1* | 5/2010 | Otani | G06F 11/3034 714/42 |
| 2011/0228651 A1 | 9/2011 | Gage et al. | |
| 2012/0201108 A1 | 8/2012 | Zheng et al. | |

(Continued)

*Primary Examiner* — Tan X Dinh
(74) *Attorney, Agent, or Firm* — Hollingsworth Davis, LLC (57) ABSTRACT

A method comprises storing a first laser current value in response to a photodetector sensing that a threshold current for a laser diode of a HAMR head has been reached, the photodetector situated proximate the laser diode. The method also comprises storing a second laser current value in response to a sensor sensing that the threshold current for the laser diode has been reached, the sensor situated away from the laser diode. The method further comprises determining a difference (delta) between the first and second laser current values, repeating the storing and determining processes during subsequent use of the laser diode, and detecting a change in the delta indicative of a malfunction of the head.

20 Claims, 11 Drawing Sheets

(56) References Cited

U.S. PATENT DOCUMENTS

| | | | |
|---|---|---|---|
| 2013/0107390 A1 | 5/2013 | Huang et al. | |
| 2014/0268406 A1* | 9/2014 | Cheng | G11B 5/607 360/75 |
| 2014/0269236 A1 | 9/2014 | Kozlovsky et al. | |
| 2015/0036469 A1* | 2/2015 | Johnson | G11B 13/08 369/13.33 |
| 2016/0104514 A1* | 4/2016 | Burnett | G11B 5/6088 369/13.33 |

\* cited by examiner

HEAT-ASSISTED MAGNETIC RECORDING DEVICE CAPABLE OF DETECTING HEAD MALFUNCTION BASED ON DIFFERENT CURRENTS OF SENSORS

SUMMARY

Embodiments are directed to a method comprising storing a first laser current value in response to a photodetector sensing that a threshold current for a laser diode of a heat-assisted magnetic recording (HAMR) head has been reached, the photodetector situated proximate the laser diode. The method also comprises storing a second laser current value in response to a sensor sensing that the threshold current for the laser diode has been reached, the sensor situated away from the laser diode. The method further comprises determining a difference (delta) between the first and second laser current values, repeating the storing and determining processes during subsequent use of the laser diode, and detecting a change in the delta indicative of a malfunction of the head.

Embodiments are directed to an apparatus comprising a HAMR head and a processor. The head comprises a laser diode, a photodetector proximate the laser diode, an optical waveguide optically coupled to the laser diode via an optical coupler, and a near-field transducer at or near an air bearing surface of the head and situated proximate the optical waveguide. A sensor is situated between the optical coupler and the air bearing surface or at the air bearing surface. The processor is configured to store a first laser current value in response to a photodetector sensing that a threshold current for the laser diode has been reached, store a second laser current value in response to the sensor sensing that the threshold current for the laser diode has been reached, and determine a difference (delta) between the first and second laser current values. The processor is further configured to repeat the storing and determining processes during subsequent use of the laser diode, detect a change in the delta indicative of a malfunction of the head.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

Figure 1:
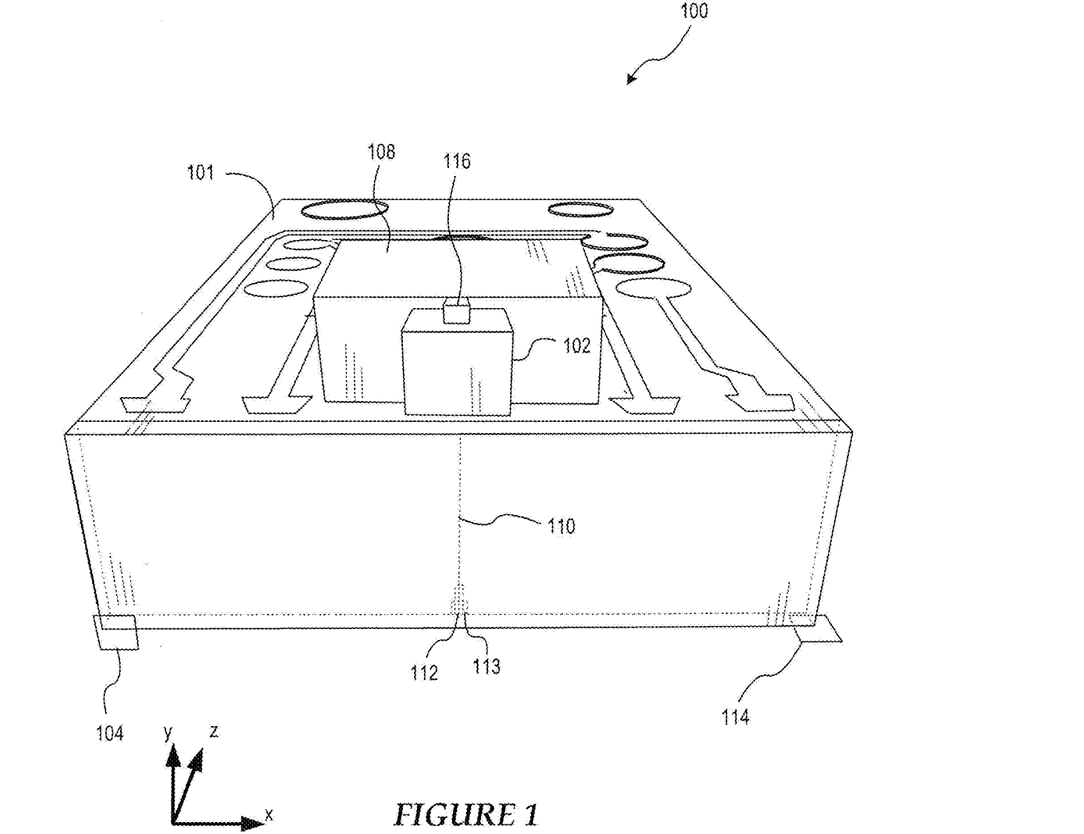
FIG. 1 is a perspective view of a HAMR slider with which various embodiments disclosed herein may be implemented.
Figure 2:
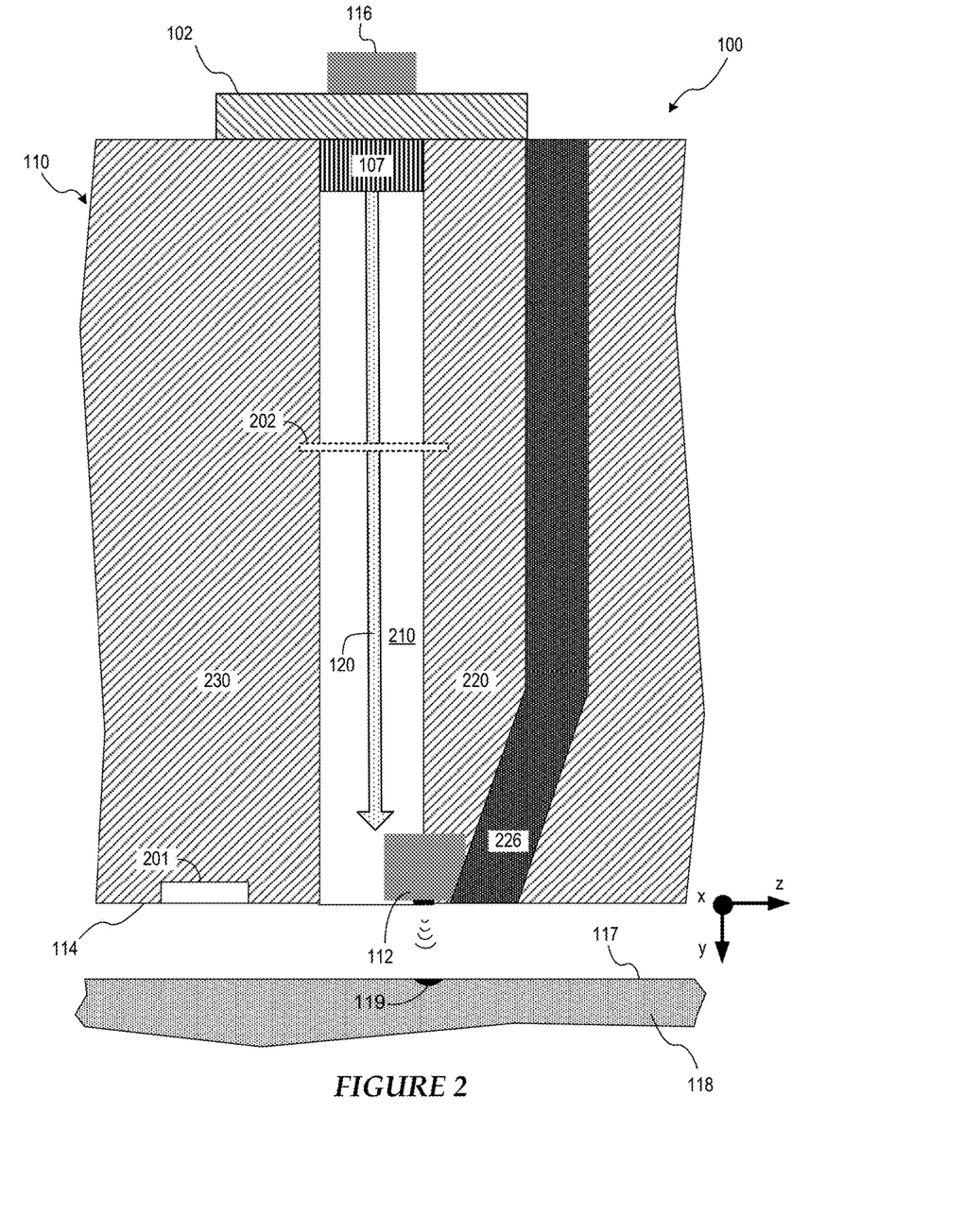
FIG. 2 is a cross-sectional view of a HAMR slider with which various embodiments disclosed herein may be implemented.

Embodiments of a HAMR head 100 are illustrated in FIGS. 1 and 2. As shown, the head 100 (also referred to as a slider) includes a light source (e.g., a laser diode) 102 located proximate a trailing edge surface 104 of the slider body 101. An optical wave (e.g., a laser beam) 120 generated by the light source 102 is delivered to an NFT 112 via an optical waveguide 110. The NFT 112 is aligned with a plane of an air bearing surface (ABS) 114 of the head 100, and one edge of a read/write head 113 is on the ABS 114. The read/write head 113 includes at least one writer and at least one reader. In some embodiments, multiple writers (e.g., 2 writers) and multiple readers (e.g., 3 readers) can be incorporated into the read/write head 113. The ABS 114 faces, and is held proximate to, a surface 117 of a magnetic medium 118 during device operation. The ABS 114 is also referred to as a media-facing surface.

The light source 102 in this representative example may be an integral, edge firing device, although it will be appreciated that any source of electromagnetic energy may be used. For example, a surface emitting laser (SEL), instead of an edge firing laser, may be used as the source 102. A light source may also be mounted alternatively to other surfaces of the head 100, such as the trailing edge surface 104. While the representative embodiments of FIGS. 1 and 2 show the waveguide 110 integrated with the head 100, any type of light delivery configuration may be used.

As shown in FIG. 1, the laser diode 102 is shown coupled to the slider body 101 via a submount 108. The submount 108 can be used to orient and affix an edge-emitting laser diode 102 so that its output is directed downwards (negative y-direction in the figure). An input surface of the slider body 101 may include a grating, and optical coupler or other coupling features to receive light from the laser diode 102. The head 100 also includes an optical energy measurement sensor, such as photodetector 116 (e.g., a photodiode), situated proximate the light source 102. The photodetector 116 is configured to measure of intensity the laser light output.

When writing with a HAMR device, electromagnetic energy is concentrated onto a small hotspot 119 over the track of the magnetic medium 118 where writing takes place, as is shown in the embodiment of FIG. 2. The light from the light source 102 propagates to the NFT 112, e.g., either directly from the light source 102 or through a mode converter or by way of a focusing element. FIG. 2, for example, shows an optical coupler 107 adjacent the light source 102, which is configured to couple light produced from the light source 102 to the waveguide 110.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 119 is on the order of 50 nm or less. Thus, the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device configured to generate local surface plasmon resonance at a designated (e.g., design) wavelength. The NFT 112 is generally formed from a thin film of plasmonic material on a substrate. In a HAMR head 100, the NFT 112 is positioned proximate the write pole 226 of the read/write head 113. The NFT 112 is aligned with the plane of the ABS 114 parallel to the surface 117 of the magnetic medium 118. The waveguide 110 and optional mode converter and/or other optical element directs electromagnetic energy 120 (e.g., laser light) onto the NFT 112. The NFT 112 achieves surface plasmon resonance in response to the incident electromagnetic energy 120. The plasmons generated by this resonance are emitted from the NFT 112 towards the magnetic medium 118 where they are absorbed to create a hotspot 119. At resonance, a high electric field surrounds the NFT 112 due to the collective oscillations of electrons at the metal surface (e.g., substrate) of the magnetic medium 118. At least a portion of the electric field surrounding the NFT 112 gets absorbed by the magnetic medium 118, thereby raising the temperature of a spot 119 on the medium 118 as data is being recorded.

FIG. 2 shows a detailed partial cross-sectional view of an embodiment of the HAN/JR head 100 in accordance with various embodiments. The waveguide 110 includes a layer of core material 210 surrounded by first and second cladding layers 220 and 230. The first cladding layer 220 is shown proximate the NFT 112 and the write pole 226. The second cladding layer 230 is spaced away from the first cladding layer 220 and separated therefrom by the waveguide core 210. The core layer 210 and cladding layers 220 and 230 may be fabricated from dielectric materials, such as optical grade amorphous material with low thermal conductivities. The first and second cladding layers 220 and 230 may each be made of the same or a different material. The materials are selected so that the refractive index of the core layer 210 is higher than refractive indices of the cladding layers 220 and 230. This arrangement of materials facilitates efficient propagation of light through the waveguide core 210. Optical focusing elements (not shown) such as mirrors, lenses, etc., may be utilized to concentrate light onto the NFT 112. These and other components may be built on a common substrate using wafer manufacturing techniques known in the art. The waveguide 110 may be configured as a planar waveguide or channel waveguide.

According to some embodiments, the head 100 includes one or more contact sensors, such as the contact sensor 201 shown in FIG. 2. The contact sensor 201 can be configured to sense for one or more of head-medium contact, thermal asperities, and voids of a magnetic recording medium. The contact sensor 201 can be implemented as a thermal sensor, such as a resistive temperature sensor (e.g., TCR sensor). For example, the contact sensor 201 can be implemented as a DETCR (Differential Ended Thermal Coefficient of Resistance sensor). The contact sensor 201 can be implemented using other technologies, such as a thermocouple or a thermistor. The contact sensor 201 is situated at or near the ABS 114 and proximate the NFT 112. As such, the contact sensor 201 can serve as a temperature sensor for the NFT 112, in addition to serving as a head-medium/asperity contact sensor.

According to some embodiments, the head 100 shown in FIG. 2 can incorporate a bolometer 202 situated in the vicinity of the light path (e.g., the waveguide 110) and proximal of the NFT 112 in accordance with various embodiments. According to some embodiments, the bolometer 202 comprises an optical-to-thermal transducer configured to respond to fluctuations in output optical power of the laser 102. In some embodiments, the bolometer 202 comprises a thin metallic wire placed across the light path (e.g., the waveguide 110) within the internal body of the slider 100 at a location between the coupler 107 and the NFT 112. A small fraction of the output optical power of the laser 102 transmitted via the light path is absorbed by the wire and converted into thermal power, thereby increasing wire temperature. Fluctuations in output optical power of the laser 102 correlate to fluctuations in thermal power and temperature of the bolometer 202. These fluctuations in temperature can be detected by circuitry configured to monitor the resistance fluctuations in the wire by using a small bias current and a high thermal coefficient of resistance material. The bolometer 202 can be placed in the light path or adjacent to optics to harvest scattered light.

As shown in FIG. 2, the bolometer 202 has a longitudinal axis that is oriented transverse to the longitudinal axis of the waveguide 110. More particularly, the bolometer 202 shown in FIG. 2 has a longitudinal axis that is oriented substantially normal to the longitudinal axis of the waveguide 110. In some embodiments, the bolometer 202 is spaced away from a core 210 of the waveguide 110 and positioned above the waveguide 110 in the x-direction. In other embodiments, the bolometer 202 is spaced away from a core 210 and positioned below the waveguide 110 in the x-direction. Rather than being oriented normal to the waveguide 110, the longitudinal axis of the bolometer 202 can be oriented diagonally with respect to the longitudinal axis of the waveguide 110. Orienting the bolometer 202 diagonally with respect to the waveguide 110 serves to expose more surface area of the bolometer 202 to optical energy transmitted along the waveguide 110 than a perpendicular orientation.

The output of a laser diode used in a HAMR drive is temperature sensitive and susceptible to self-heating. During write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another. Large transition shifts in a block of data may not be recoverable by channel decoding, resulting in error bits.

According to various HAMR drive embodiments, a photodetector (e.g., a photodiode) is used as a laser power monitor to detect the laser diode output efficiency. Like the laser diode, the photodetector itself can be temperature sensitive and susceptible to self-heating. The temperature sensitivity of the photodetector can cause inaccurate laser diode output detection and compensation. Although photodetector temperature sensitivity can be measured externally with an external laser input, there are presently no techniques available that facilitate in situ (inside the drive) monitoring of photodetector performance and calibrating of the photodetector.

Embodiments of the disclosure are directed to apparatuses and methods for monitoring the light delivery system of a HAMR drive inside (in-situ) the drive. Embodiments are directed to apparatuses and methods for monitoring the health (general functioning) of different components of the light delivery system of a HAMR drive during in-field use of the drive.

Some embodiments are directed to apparatuses and methods for monitoring photodetector performance inside the drive, such as determining how much a photodetector is drifting with temperature. Other embodiments are directed to apparatuses and methods for calibrating a photodetector. According to various embodiments, a sensor situated away from the laser diode is used to monitor the performance of the photodetector situated proximate the laser diode. For example, a sensor situated proximate the waveguide and/or NFT of a HAMR head can be used to evaluate the output of the photodetector. For example, the sensor can be used to detect drifting of the photodetector output with temperature, due to self-heating for example. According to other embodiments, the photodetector and sensor can be used cooperatively to evaluate the performance of other components of a HAMR head, such as the NFT and the optical coupler between the laser diode and the optical waveguide.

According to various embodiments, the performance of a photodetector that monitors a laser diode of a HAMR head is evaluated using another sensor of the head, preferably a sensor situated away from the laser diode. In general terms, the photodetector is used to measure the point at which the laser diode turns on (i.e., when the laser diode reaches its threshold current). The sensor is used to measure the point at which the NFT turns on by excitation responsive to receiving light from the laser diode. The sensor is preferably one that changes resistance as a function of temperature, but itself does not drift at a constant drive temperature. The photodetector, in contrast, is susceptible to drifting at a constant drive temperature due to self-heating. Outputs from the photodetector and the sensor are compared and the difference (referred to herein as a "delta") between the outputs is calculated. This procedure is preferably performed at a number of different operating temperatures. A change in the delta beyond a predetermined threshold is indicative of a malfunction of the HAMR head, such as drifting of the photodetector due to self-heating. A change in the delta beyond a predetermined threshold can be indicative of other head malfunctions, such as damage to the NFT or contamination of the optical coupler between the laser diode and the optical waveguide of the head.

To verify the efficacy of the photodetector assessment methodology, experiments were performed using two HAMR drives operating at different temperatures, referred to as cold, ambient, and hot temperatures. For purposes of the experiments, cold refers to a temperature of 6.5° C., ambient refers to a temperature of 30° C., and hot refers to a temperature of 58° C. The sensor used to monitor the turn-on point of the NFT was the contact sensor (e.g., DETCR) situated on the air bearing surface of the head near the NFT and the writer. The contact sensor has a resistance that changes as a function of temperature and, therefore, is well-suited for sensing temperature changes due to excitation of the NFT. Other sensors of the HAMR head that experience a change in resistance due to a change in temperature can be used to sense for excitation of the NFT, such as a bolometer, writer, reader or heater.

At each of the operating temperatures, the output of the photodetector was measured to determine the turn-on point of the laser diode. The output of the contact sensor was measured to determine the turn-on point of the NFT. The turn-on points of the laser diode and NFT were compared, and a delta was calculated as a result of this comparison. These data for the two HAMR drives ("A" and "B") is summarized in Table 1 below.

TABLE 1

| Drive | Sensor | Temperature | | |
|---|---|---|---|---|
| | | $I_{BIAS}$ Cold (6.5° C.) | $I_{BIAS}$ Ambient (30° C.) | $I_{BIAS}$ Hot (58° C.) |
| "A" | Contact Sensor (DAC) | 39 | 44 | 48 |
| | Photodetector (DAC) | 40 | 44 | 51 |
| | Delta (DAC) | −1 | 0 | −3 |
| "B" | Contact Sensor (DAC) | 39 | 40 | 48 |
| | Photodetector (DAC) | 39 | 41 | 47 |
| | Delta (DAC) | 0 | −1 | 1 |

The values of $I_{BIAS}$ in Table 1 above are given in terms of DAC (digital-to-analog converter) values. The magnitude of a DAC value corresponds to the magnitude of bias current supplied to the laser diode by the power supply. For example, one DAC value can correspond to 0.275 mA of laser diode bias current. It is understood that metrics other than DAC values can be used in photodetector assessment methodology.

As is shown in Table 1 above, the contact sensor for Drive "A" operating cold detected the turn-on point of the NFT at an $I_{BIAS}$ DAC value of 39, while the photodetector detected the turn-on point of the laser diode at an $I_{BIAS}$ DAC value of 40. The difference or delta between these two $I_{BIAS}$ DAC values is −1. In this illustrative embodiment, a delta of zero or +/−1 DAC value indicates that the outputs of the contact sensor and photodetector are substantially equivalent (e.g., the photodetector is accurately tracking the contact sensor). A delta of greater than +/−1 DAC value, for example, can indicate that the outputs of the contact sensor and photodetector are unequal (e.g., the photodetector is not accurately tracking the contact sensor). As such, a delta of greater than the predetermined threshold of +/−1 DAC value in this illustrative embodiment indicates a malfunction of the head, such as drifting of the photodetector due to self-heating. It is understood that the predetermined threshold against which the value of delta is compared can vary depending on a number of factors, including the particular metric used in the comparison and the head or drive design, among other factors.

The contact sensor for Drive "A" operating at ambient detected the turn-on point of the NFT at an $I_{BIAS}$ DAC value of 44, while the photodetector detected the turn-on point of the laser diode at an $I_{BIAS}$ DAC value of 44. The difference or delta between these two $I_{BIAS}$ DAC values is 0, indicating that the photodetector is operating properly at ambient. The contact sensor for Drive "A" operating hot detected the turn-on point of the NFT at an $I_{BIAS}$ DAC value of 48, while the photodetector detected the turn-on point of the laser diode at an $I_{BIAS}$ DAC value of 51. The difference or delta between these two $I_{BIAS}$ DAC values is −3, indicating that the photodetector is not operating properly. In response to detecting a delta of −3, the drive is configured to take various forms of corrective action, such as recalibration of the photodetector.

The contact sensor and photodetector data presented in table 1 above for Drive "B" demonstrates that the photodetector is operating properly at cold, ambient and hot temperatures. The values of delta at cold, ambient, and hot temperatures are 0, −1, and 1, respectively. Since none of these values of delta exceed the predetermined threshold of >+/−1 DAC value in this illustrative example, the photodetector is considered to be operating properly at each of these drive temperatures.

Figure 3A:
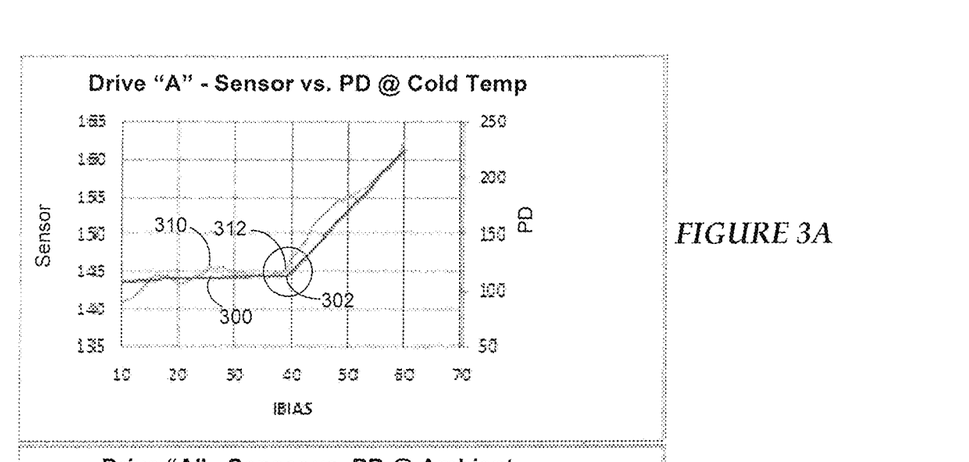
FIGS. 3A-3C are graphs showing experimental contact sensor and photodetector output measurements as a function of bias current ($I_{BIAS}$) supplied to a laser diode for a first drive operating at cold, ambient, and hot temperatures in accordance with various embodiments.
Figure 3B:
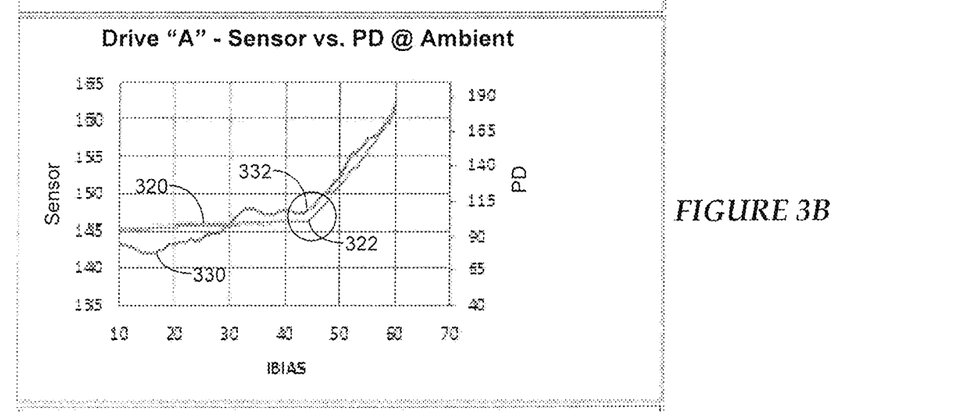
Figure 3C:
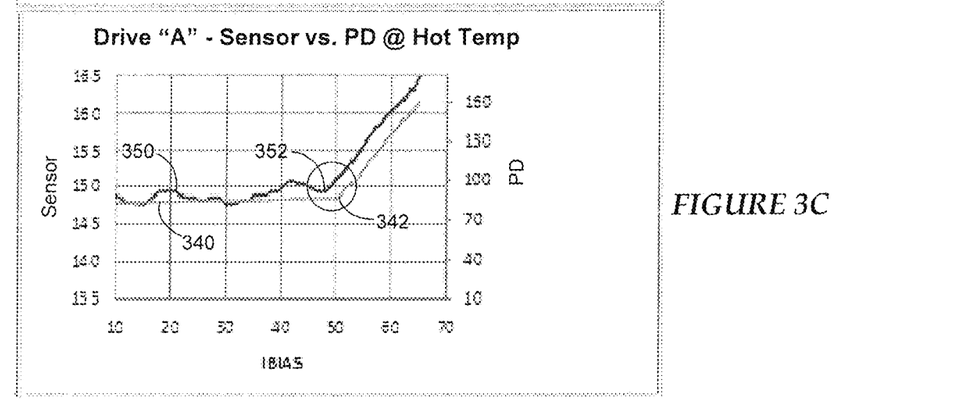
Figure 4A:
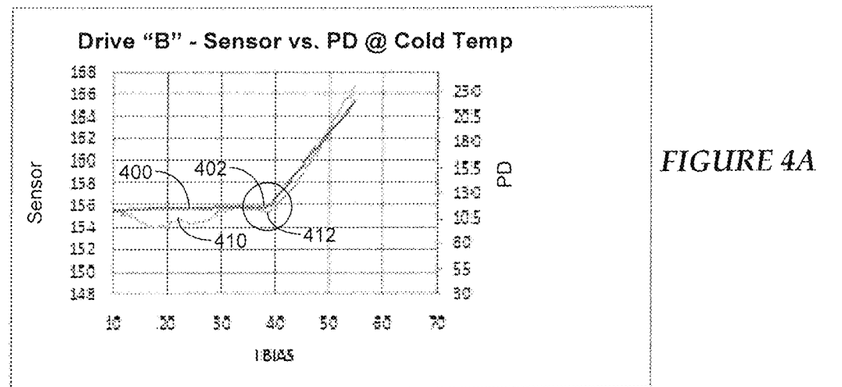
FIGS. 4A-4C are graphs showing experimental contact sensor and photodetector output measurements as a function of bias current ($I_{BIAS}$) supplied to a laser diode for a second drive operating at cold, ambient, and hot temperatures in accordance with various embodiments.
Figure 4B:
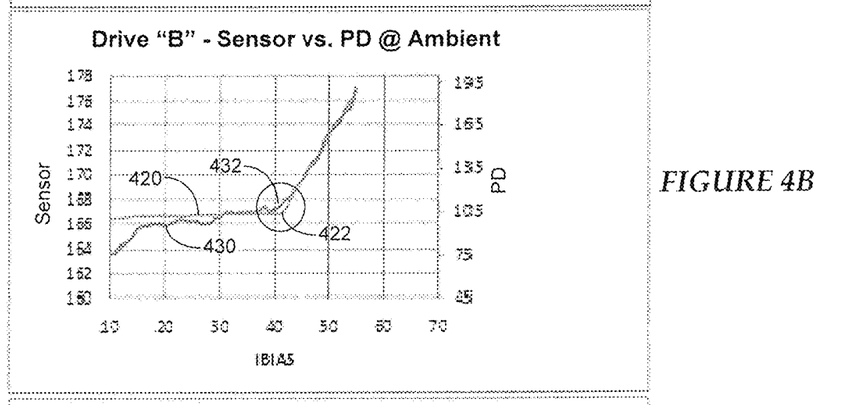
Figure 4C:
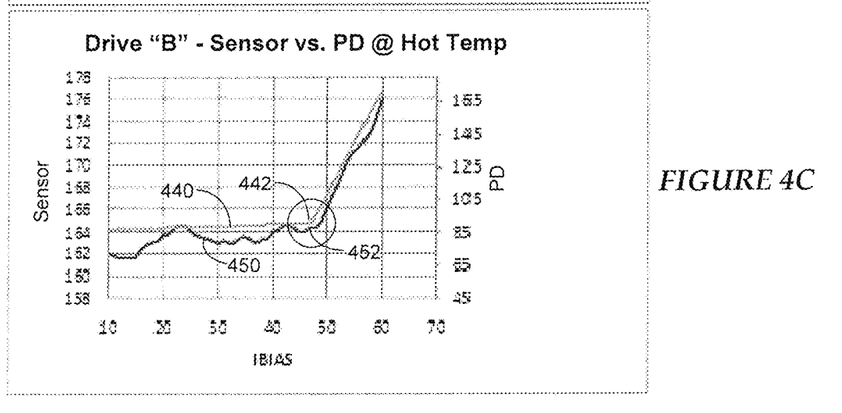

The data summarized in Table 1 above are provided in graphical form in FIGS. 3A-3C (for Drive "A") and FIGS. 4A-4C (for Drive "B"). FIGS. 3A-3C are graphs showing contact sensor and photodetector (PD) output measurements as a function of bias current ($I_{BIAS}$) supplied to the laser diode for Drive "A" operating at cold, ambient, and hot temperatures. In FIGS. 3A-3C, the left y-axis is the contact sensor output from a preamp analog-to-digital converter. The right y-axis is the photodetector output from a preamp analog-to-digital converter. The x-axis is bias current ($I_{BIAS}$) supplied to the laser diode.

Referring to FIG. 3A, the photodetector and contact sensor output measurements at the cold drive temperature (6.5° C.) are shown as curves 300 and 310, respectively. A knee 302 in the curve 300 for the photodetector can be seen at an $I_{BIAS}$ value of about 40, the point at which the photodetector detects the turn-on point of the laser diode. A knee 312 in the curve 310 for the contact sensor can be seen at an $I_{BIAS}$ value of about 39, the point at which the contact sensor detects the turn-on point of the NFT. Because the delta of −1 between the two $I_{BIAS}$ values is less than the predetermined threshold (e.g., >+/−1 DAC value), the photodetector is considered to be accurately tracking the contact sensor and deemed to be operating properly.

Regarding FIG. 3B, the photodetector and contact sensor output measurements at the ambient drive temperature (30° C.) are shown as curves 320 and 330, respectively. A knee 322 in the curve 320 for the photodetector can be seen at an $I_{BIAS}$ value of about 44, the point at which the photodetector detects the turn-on point of the laser diode. A knee 332 in the curve 330 for the contact sensor can be seen at an $I_{BIAS}$ value of about 44, the point at which the contact sensor detects the turn-on point of the NFT. Because the delta between the two $I_{BIAS}$ values is 0, the photodetector is considered to be accurately tracking the contact sensor and deemed to be operating properly.

In FIG. 3C, the photodetector and contact sensor output measurements at the hot drive temperature (58° C.) are shown as curves 340 and 350, respectively. A knee 342 in the curve 340 for the photodetector can be seen at an $I_{BIAS}$ value of about 51, the point at which the photodetector detects the turn-on point of the laser diode. A knee 352 in the curve 350 for the contact sensor can be seen at an $I_{BIAS}$ value of about 48, the point at which the contact sensor detects the turn-on point of the NFT. Here, the delta of −3 between the two $I_{BIAS}$ values is greater than the predetermined threshold (e.g., >+/−1 DAC value). As such, the photodetector is not accurately tracking the contact sensor, indicating occurrence of a head malfunction, such as drifting of the photodetector due to self-heating.

FIGS. 4A-4C are graphs showing contact sensor and photodetector output measurements as a function of bias current ($I_{BIAS}$) supplied to the laser diode for Drive "B" operating at cold, ambient, and hot temperatures. In FIG. 4A, photodetector (e.g., photodiode) and contact sensor curves 400 and 410 have knees 402 and 412 that occur at the same $I_{BIAS}$ value (39), indicating that the photodetector is operating properly at the cold drive temperature. In FIG. 4B, photodetector and contact sensor curves 420 and 430 have knees 422 and 432 that occur within 1 DAC value of $I_{BIAS}$ (41 and 40), indicating that the photodetector is operating properly at the ambient drive temperature. In FIG. 4C, photodetector and contact sensor curves 440 and 450 have knees 442 and 452 that occur within 1 DAC value of $I_{BIAS}$ (47 and 48), indicating that the photodetector is operating properly at the ambient drive temperature.

Figure 5:
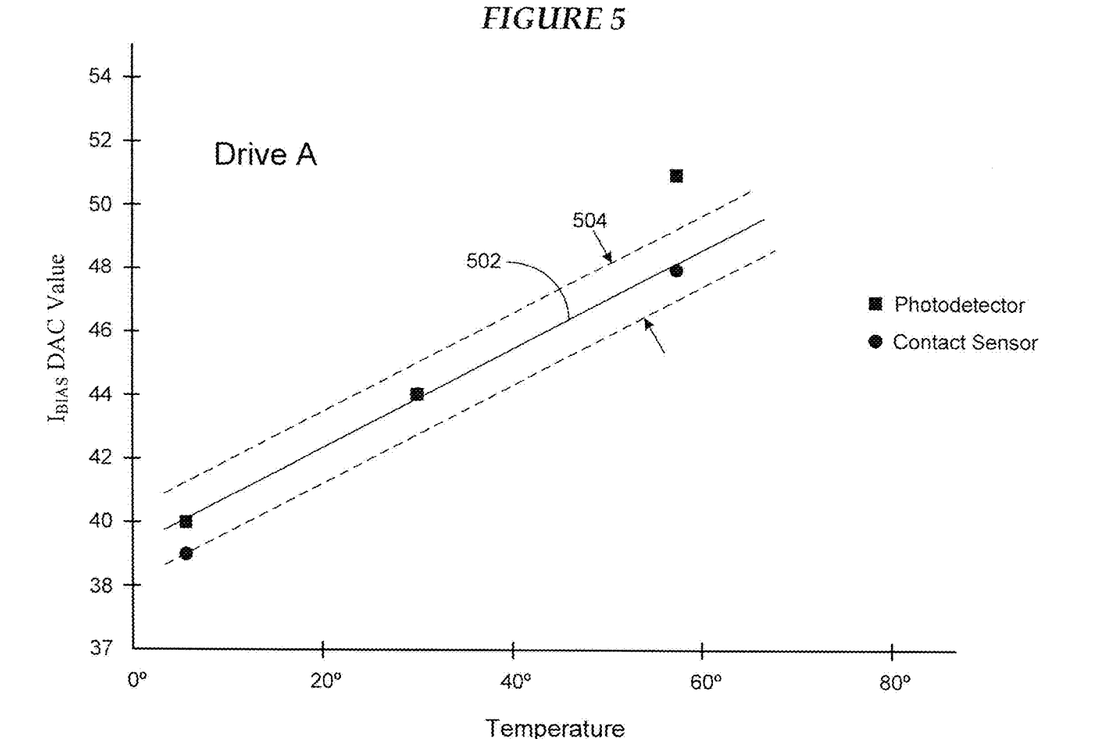
FIG. 5 is a plot of photodetector and contact sensor $I_{BIAS}$ DAC (digital-to-analog converter) values as a function of temperature for the first drive in accordance with various embodiments.

FIG. 5 is a plot of photodetector and contact sensor DAC values as a function of temperature for Drive "A" derived from Table 1 above. More particularly, the photodetector and contact sensor DAC values at cold (6.5° C.), ambient (38° C.), and hot (58° C.) drive temperatures are plotted in FIG. 5. A curve 502 is fitted to the contact sensor DAC data, and a tolerance band 504 is generated around curve 502 based on the magnitude of the predetermined threshold for the delta comparison. In the illustrative example shown in FIG. 5, the tolerance zone 504 represents DAC values +/−1 DAC value away from the curve 502. It is understood that the tolerance zone can be modified to accommodate a desired predetermined threshold for the delta comparison.

It can be seen in FIG. 5 that the photodetector DAC value of 51 at the hot drive temperature falls outside of the tolerance band 504, indicating that the photodetector is drifting with temperature. In response, the drive can undertake a corrective action to address the photodetector malfunction. For example, the drive can initiate a recalibration of the photodetector, which typically involves re-optimization of the bit error rate (BER) and alteration of the bias current supplied to the laser diode. Following the recalibration procedure, the photodetector and contact sensor measurement methodology described above can be repeated and replacement data added to Table 1 above. New photodetector and contact sensor curves, such as those shown in FIGS. 3A-3C, can be generated and the plot shown in FIG. 5 can be updated. This may result in an alteration to the curve 502 and the tolerance band 504. During operation of Drive "A", the curve 502 and tolerance band 504 can be used to determine if the photodetector is properly tracking the contact sensor (within the predetermined threshold) at the current operating temperature of Drive "A".

Figure 6:
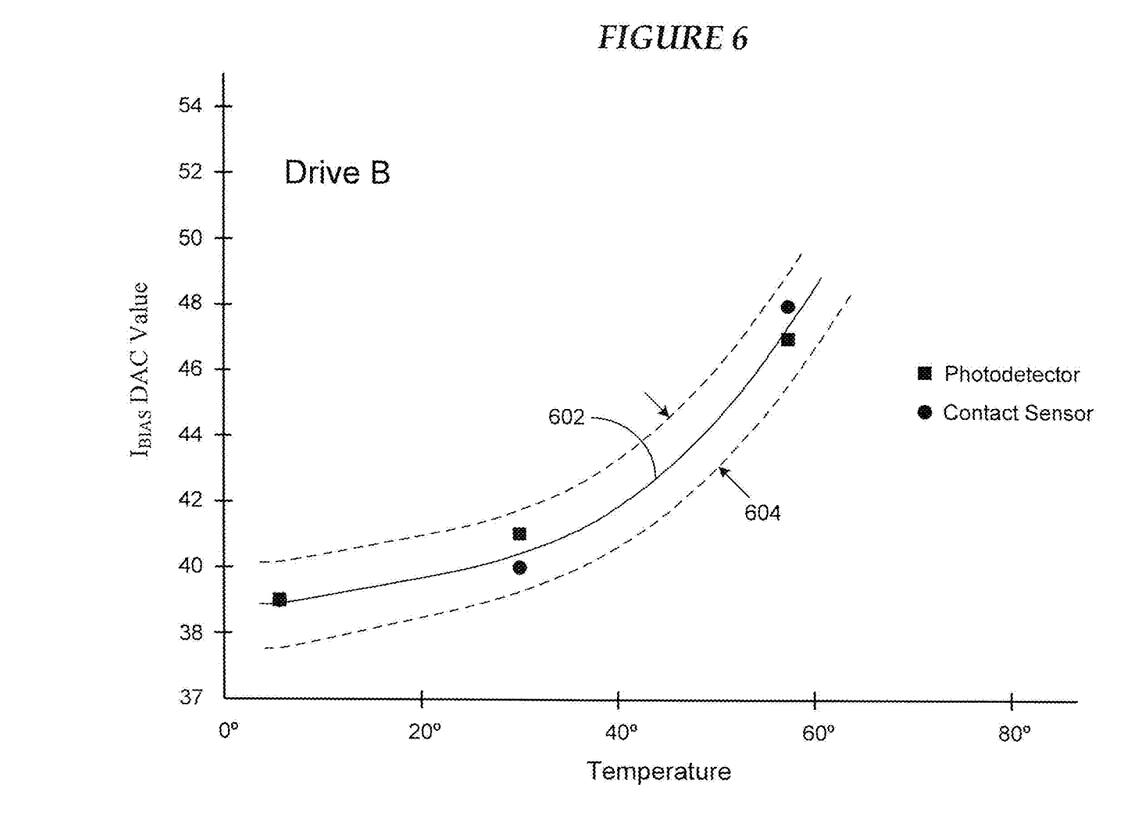
FIG. 6 is a plot of photodetector and contact sensor $I_{BIAS}$ DAC (digital-to-analog converter) values as a function of temperature for the second drive in accordance with various embodiments.

It is noted that the curve 502 shown in FIG. 5 is relatively linear for Drive "A", which is not necessarily the case for other drives. FIG. 6 is a plot of photodetector and contact sensor DAC values as a function of temperature for Drive "B" derived from Table 1 above. A curve 602 is fitted to the contact sensor DAC data, and a tolerance band 604 is generated around the curve 602 based on the magnitude of the predetermined threshold for the delta comparison (e.g., +/−1 DAC value). It can be seen that the curve 602 is not linear. As was discussed previously, the DAC values for the photosensor and contact sensor at the cold, ambient, and hot temperatures all fall within the tolerance and 604, indicating that the photodetector is operating properly across the temperature range shown in FIG. 6.

Figure 7:
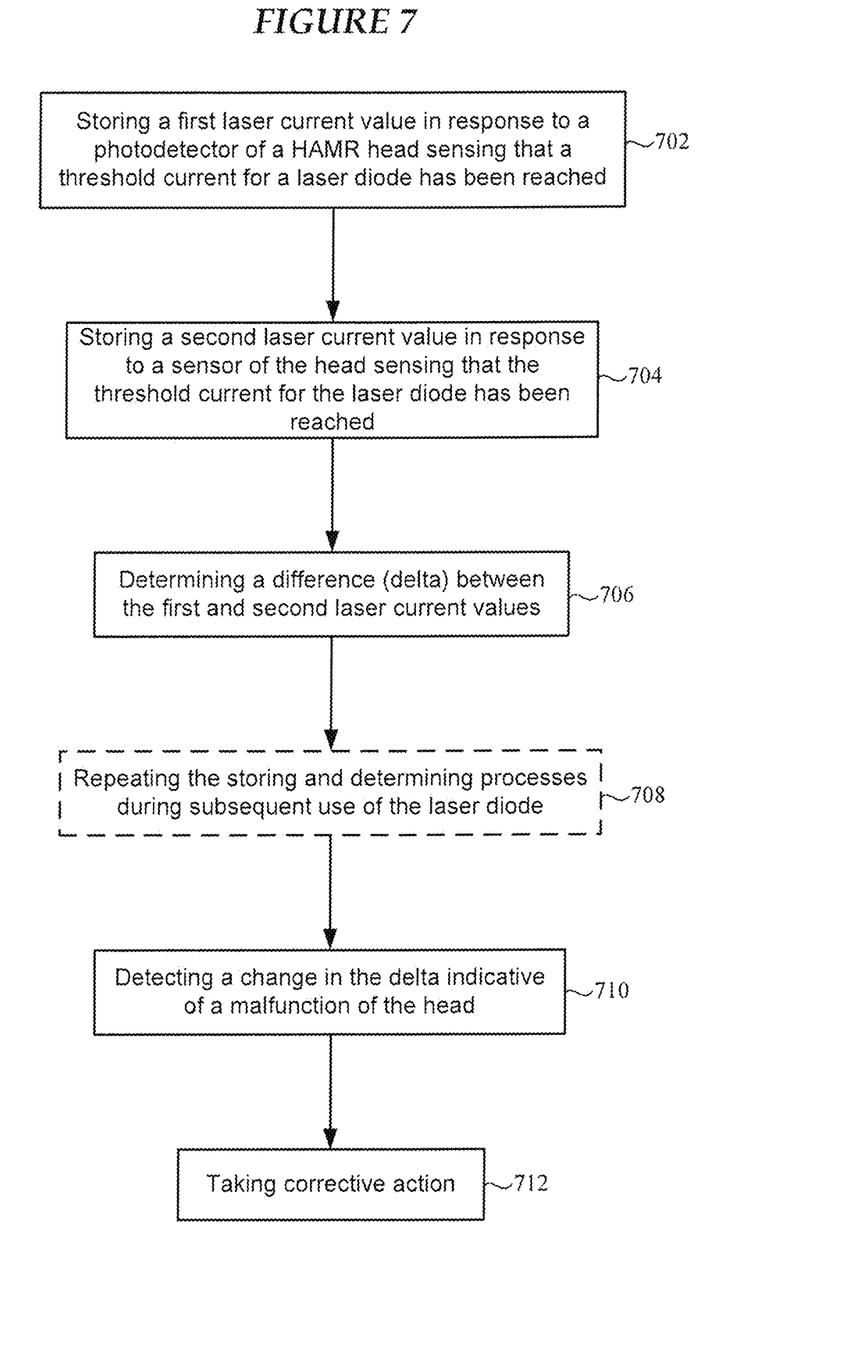
FIG. 7 is a flow chart showing various processes of a photodetector assessment methodology in accordance with various embodiments.

FIG. 7 is a flow chart showing various processes of a photodetector assessment methodology in accordance with various embodiments. The method shown in FIG. 7 involves storing 702 a first laser current value in response to a photodetector of a HAMR head sensing that a threshold current for a laser diode has been reached. The method involves storing 704 a second laser current value in response to a sensor of the head sensing that the threshold current for the laser diode has been reached. As was discussed previously, the sensor can be a contact sensor, bolometer, writer, reader, or heater of the head. The method also involves determining 706 a difference or delta between the first and second laser current values, and repeating 708 the storing and determining processes during subsequent use of the laser diode. The method further involves detecting 710 a change in the delta indicative of a malfunction of the head, and taking corrective action 712.

Figure 8:
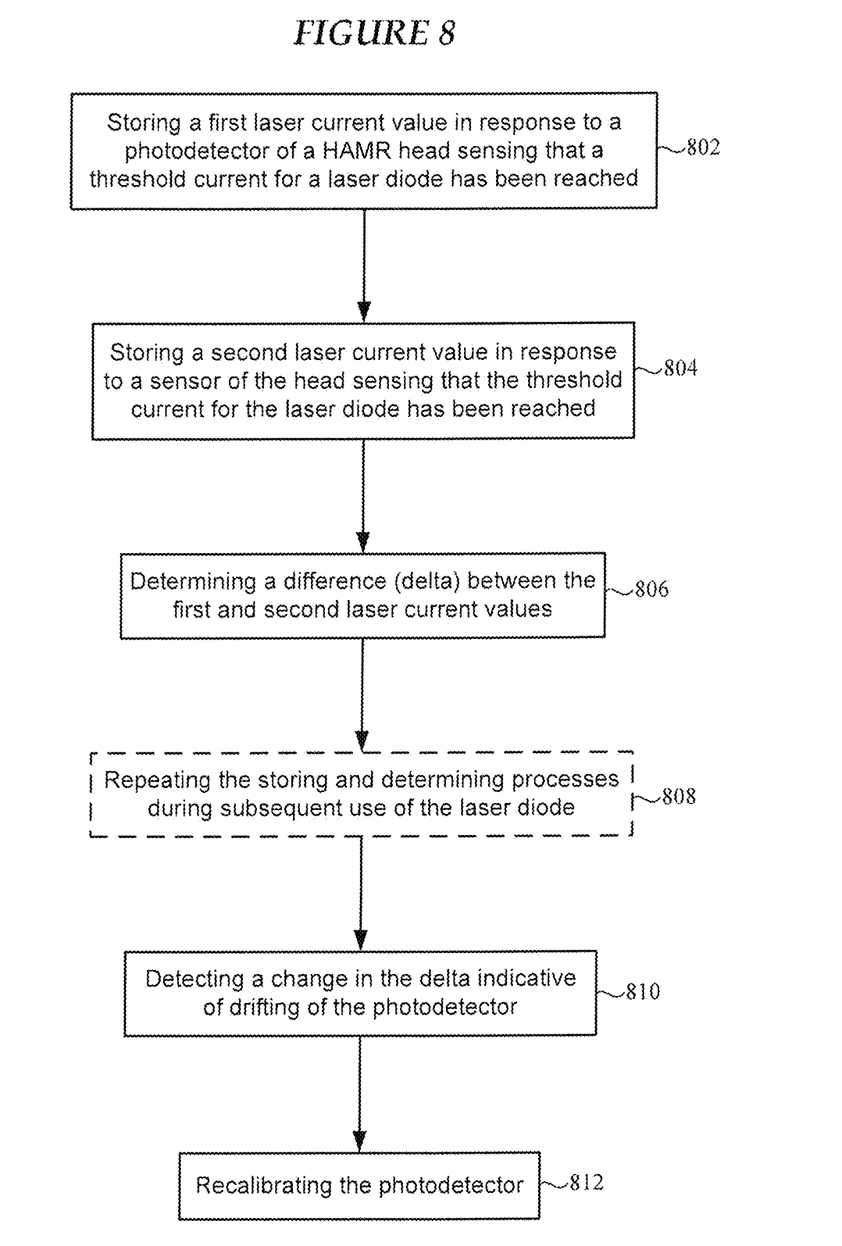
FIG. 8 is a flow chart showing various processes of a photodetector assessment methodology in accordance with other embodiments.

FIG. 8 is a flow chart showing various processes of a photodetector assessment methodology in accordance with various embodiments. The method shown in FIG. 8 involves storing 802 a first laser current value in response to a photodetector of a HAMR head sensing that a threshold current for a laser diode has been reached. The method involves storing 804 a second laser current value in response to a sensor of the head sensing that the threshold current for the laser diode has been reached. The method also involves determining 806 a difference or delta between the first and second laser current values, and repeating 808 the storing and determining processes during subsequent use of the laser diode. The method further involves detecting 810 a change in the delta indicative of drifting of the photodetector, and, in response, recalibrating 812 the photodetector.

Figure 9:
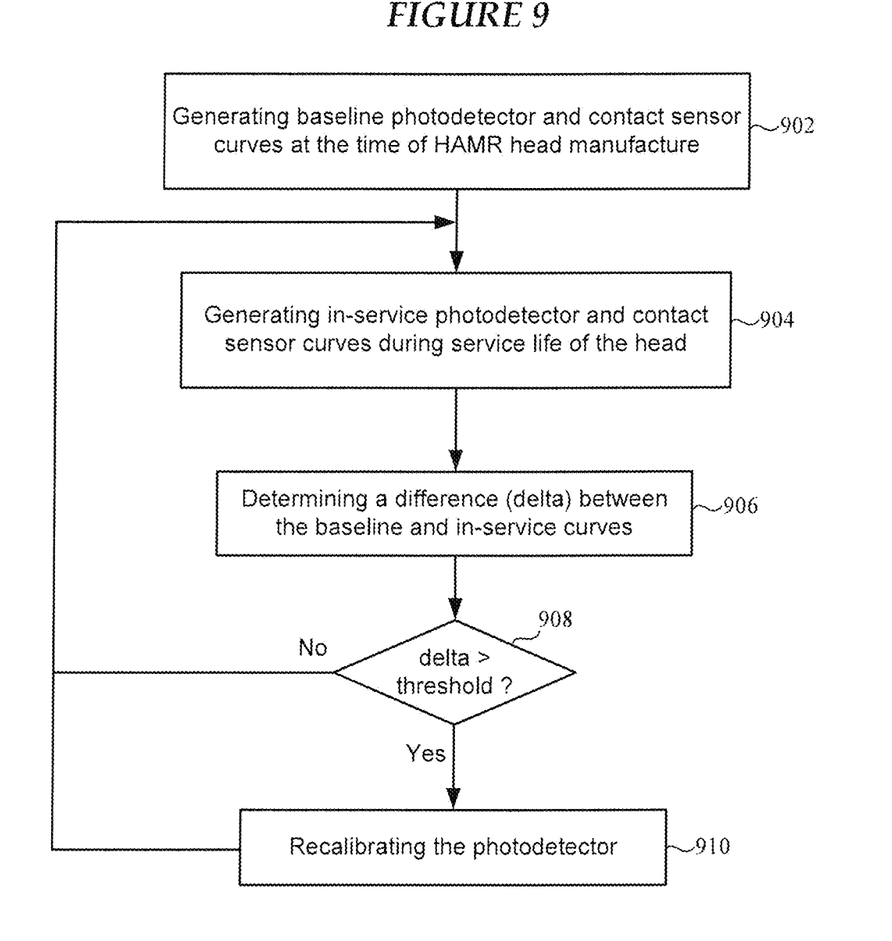
FIG. 9 is a flow chart showing various processes of a photodetector assessment methodology in accordance with some embodiments.

FIG. 9 is a flow chart showing various processes of a photodetector assessment methodology in accordance with various embodiments. The method shown in FIG. 9 involves generating 902 baseline photodetector and contact sensor curves at the time of HAMR head manufacturer. Examples of such curves are shown in FIGS. 3A-3C and 4A-4C. The method involves generating 904 in-service photodetector and contact sensor curves during the service life of the head. The method also involves determining 906 a difference or delta between the baseline and in-service curves (e.g., a difference between values corresponding to the knees in the curves). A check is made 908 to determine if the two curves differ by more than a predetermined threshold (e.g., a predetermined number of $I_{BIAS}$ DAC values). If the two curves do not differ by the predetermined threshold, processing continues at block 904. If the threshold is exceeded, the method further involves recalibrating 910 the photodetector to ensure that the drive features which depend on the photodetector remain valid. It is noted that if the photodetector is not insensitive to temperature or it suddenly becomes so in the field, the relationship between the contact sensor and the photodetector curves can be used to correct for the non-linearity in the photodetector curve.

Figure 10:
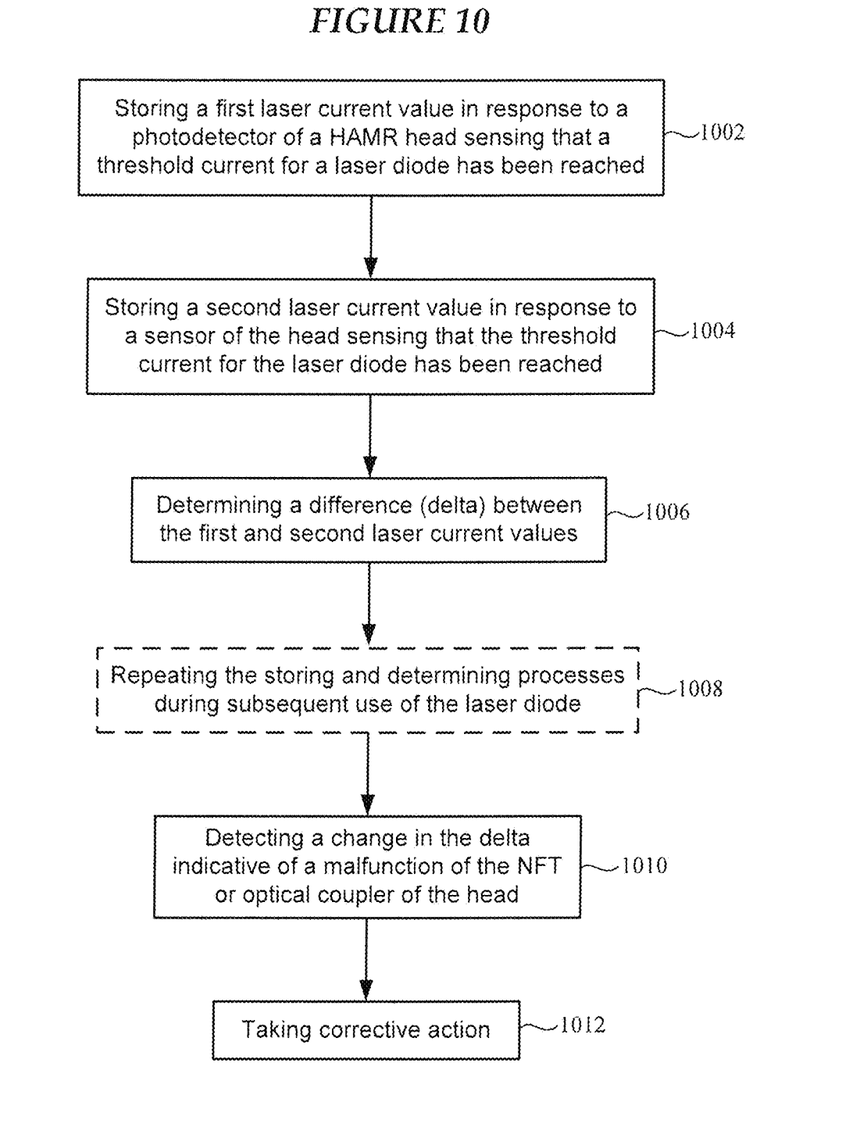
FIG. 10 is a flow chart showing various processes of a photodetector assessment methodology in accordance with various embodiments.

FIG. 10 is a flow chart showing various processes of a photodetector assessment methodology in accordance with various embodiments. The method shown in FIG. 10 involves storing 1002 a first laser current value in response to a photodetector of a HAMR head sensing that a threshold current for a laser diode has been reached. The method involves storing 1004 a second laser current value in response to a sensor of the head sensing that the threshold current for the laser diode has been reached. The method also involves determining 1006 a difference or delta between the first and second laser current values, and repeating 1008 the storing and determining processes during subsequent use of the laser diode. The method further involves detecting 1010 a change in the delta indicative of a malfunction of the NFT or optical coupler of the head. The method also involves taking corrective action 1012 to address the NFT or optical coupler malfunction.

For example, the health of the NFT can be monitored in the field by periodically comparing the photodetector and contact sensor curves (see, e.g., FIGS. 3A-3C and 4A-4C) to determine whether the relationship between these two curves has changed. As was discussed previously, the contact sensor is heated because it is in close proximity to the optical waveguide and the NFT. If overtime the NFT or optical path gets damaged, the efficiency will drop. This change in efficiency will cause the relationship between the photodetector and contact sensor curves to change. This change may be measured as the difference in $I_{BIAS}$ DAC values at the knees of the curves by more than a predetermined threshold. In this illustrative example, it is assumed that the $I_{BIAS}$ DAC values for the photodetector fall within the tolerance band (indicating that the photodetector is operating properly) and that one or more $I_{BIAS}$ DAC values for the contact sensor fall outside of the tolerance band (indicating that the contact sensor is operating abnormally—e.g., not tracking the properly operating photodetector).

Similarly, the health of the optical coupler between the laser diode and the optical waveguide of the slider can be monitored in the field by periodically comparing the photodetector and contact sensor curves to determine whether the relationship between these two curves has changed. If overtime the optical coupler gets contaminated or damaged, the relationship between the contact sensor curve and the photodetector curve will change. This change occurs because less light will be coupled into the optical waveguide when the optical coupler is contaminated (e.g., dirty) or damaged. This will cause the contact sensor to heat less and will change the relationship between the photodetector a contact sensor curves.

Figure 11:
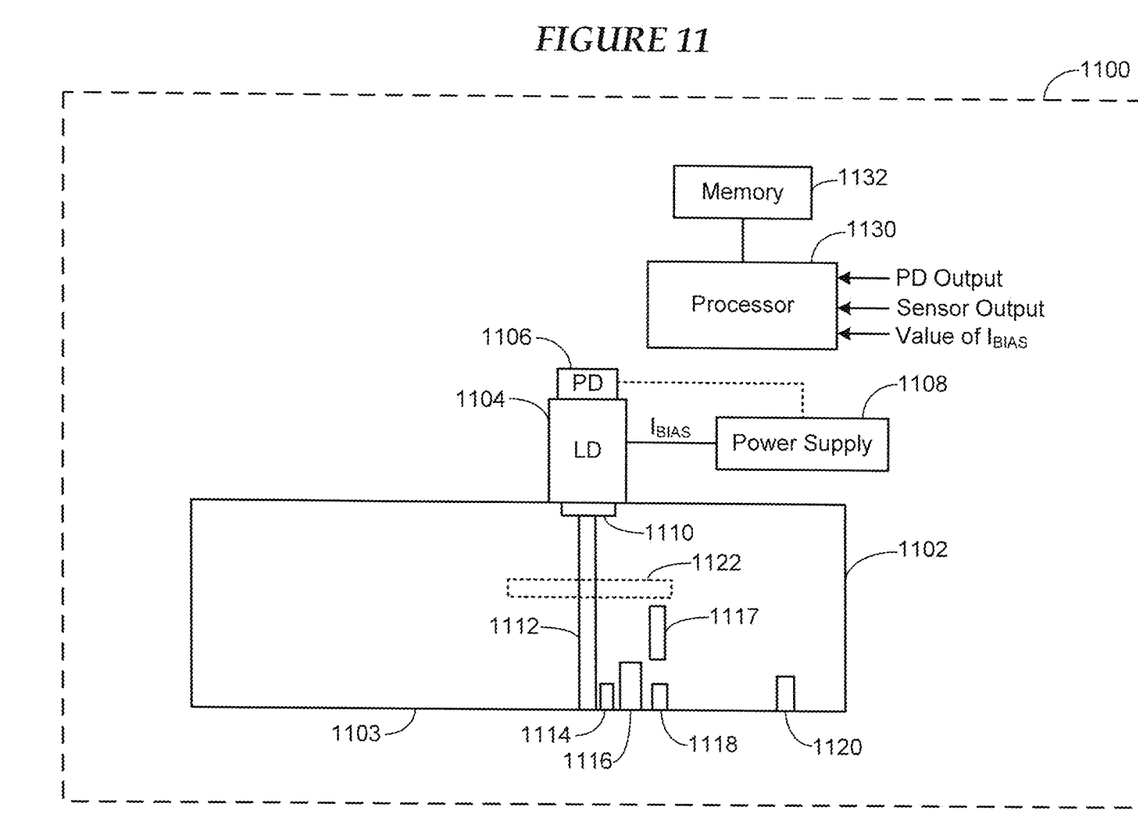
FIG. 11 is a block diagram of a system for monitoring photodetector performance inside a HAMR drive in accordance with various embodiments.

FIG. 11 is a block diagram of a system for monitoring photodetector performance inside a HAMR drive in accordance with various embodiments. FIG. 11 shows a portion of a HAMR drive 1100 which includes a slider 1102 upon which a laser diode 1104 is mounted. A photodetector 1106 is mounted on or in close proximity to the laser diode 1104. A power supply 1108 is coupled to the laser diode 1104 and provides a biasing current, $I_{BIAS}$, to the laser diode 1104. An output of the photodetector 1106 is coupled to the power supply 1108. The power supply 1108 can adjust the bias current supplied to the laser diode 1104 in response to the photodetector output.

The slider 1102 includes a number of components including an optical waveguide 1112 which is optically coupled to the laser diode 1104 via an optical coupler 1110. The optical waveguide 1112 extends from the optical coupler 1110 to the NFT 1114 situated at the air bearing surface 1103 proximate the optical waveguide 1112. In some embodiments, a bolometer 1122 is situated proximate the optical waveguide 1112. A writer 1116 is situated proximate the NFT 1114. A heater 1117 is situated proximate the writer 1116 and configured to thermally actuate the writer 1116.

As was discussed previously, a portion of the NFT 1114 can contact a write pole of the writer 1116, serving as a heatsink for the NFT 1114. The contact sensor 1118 is situated proximate the writer 1116 and NFT 1114 (e.g., at a close point of the writer). In some embodiments, the contact sensor 1118 can be located on the opposite side of the waveguide 1112. A reader 1120 is shown positioned away from the writer 1116 and contact sensor 1118. In some embodiments, the contact sensor 1118 can be situated equidistant from the writer 1116 and the reader 1120.

The HAMR head 1100 further includes a processor 1130 coupled to a memory 1132. As shown in FIG. 11, the processor 1130 receives a number of inputs from the various components of the slider 1102. For example, the processor 1130 receives an output from the photodetector 1106, a sensor output from the contact sensor 1118 (or the bolometer 1122, writer 1116, heater 1117 or reader 1120), and the value of the supply current, $I_{BIAS}$, from the power supply 1108. The processor 1130 is configured to perform the various methodologies disclosed hereinabove.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
    storing a first laser current value in response to a photodetector sensing that a threshold current for a laser diode of a HAMR head has been reached, the photodetector situated proximate the laser diode;
    storing a second laser current value in response to a sensor sensing that the threshold current for the laser diode has been reached, the sensor situated away from the laser diode;
    determining a difference (delta) between the first and second laser current values;
    repeating the storing and determining processes during subsequent use of the laser diode; and
    detecting a change in the delta indicative of a malfunction of the head.

2. The method of claim 1, wherein the detected change in the delta is indicative of drifting of the photodetector relative to the sensor.

3. The method of claim 1, wherein the detected change in the delta is indicative of a malfunction of a near-field transducer of the head.

4. The method of claim 1, wherein the detected change in the delta is indicative of a malfunction of an optical coupler between the laser diode and an optical waveguide of the head.

5. The method of claim 1, further comprising recalibrating the photodetector in response to the detected change in the delta.

6. The method of claim 1, wherein:
    the head further comprises:
        an optical waveguide optically coupled to the laser diode via an optical coupler;
        a near-field transducer at or near an air bearing surface of the head; and
    the sensor is situated between the optical coupler and the air bearing surface or at the air bearing surface.

7. The method of claim 1, wherein the sensor is situated proximate one or both of a near-field transducer and an optical waveguide of the head.

8. The method of claim 1, wherein the sensor comprises a contact sensor having a temperature coefficient of resistance.

9. The method of claim 1, wherein the sensor comprises one of a writer, a reader, and a heater of the head.

10. The method of claim 1, wherein the sensor comprises a bolometer proximate an optical waveguide of the head.

11. The method of claim 1, wherein the first and second laser current values comprise digital-to-analog (DAC) values corresponding to levels of current supplied to the laser diode.

12. The method of claim 1, further comprising:
    generating, during head manufacture, a first curve indicative of an output signal of the photodetector as a function of laser diode bias current, the first curve including a threshold current of the laser diode;
    generating, during head manufacture, a second curve indicative of an output signal of the sensor as a function of laser diode bias current, the second curve including the threshold current of the laser diode;
    generating the first and second curves during the service life of the head;
    comparing the first and second curves generated during head manufacture (first set of curves) with the first and second curves generated during the service life of the head (second set of curves); and
    detecting a difference between the threshold currents of the first and second curve sets indicative of the malfunction of the head.

13. An apparatus, comprising:
    a HAMR head comprising:
        a laser diode and a photodetector proximate the laser diode;
        an optical waveguide optically coupled to the laser diode via an optical coupler;
        a near-field transducer at or near an air bearing surface of the head and situated proximate the optical waveguide; and
        a sensor situated between the optical coupler and the air bearing surface or at the air bearing surface; and
    a processor configured to:
        store a first laser current value in response to a photodetector sensing that a threshold current for the laser diode has been reached;
        store a second laser current value in response to the sensor sensing that the threshold current for the laser diode has been reached;
        determine a difference (delta) between the first and second laser current values;
        repeat the storing and determining processes during subsequent use of the laser diode; and
        detect a change in the delta indicative of a malfunction of the head.

14. The apparatus of claim 13, wherein the sensor is situated proximate one or both of the near-field transducer and the optical waveguide.

15. The apparatus of claim 13, wherein the sensor comprises a contact sensor having a temperature coefficient of resistance.

16. The apparatus of claim 13, wherein the sensor comprises one of a writer, a reader, and a heater of the head.

17. The apparatus of claim 13, wherein the sensor comprises a bolometer proximate the optical waveguide.

18. The apparatus of claim 13, wherein the detected change in the delta is indicative of drifting of the photodetector relative to the second sensor.

19. The apparatus of claim 13, wherein the detected change in the delta is indicative of a malfunction of the near-field transducer.

20. The apparatus of claim 13, wherein the detected change in the delta is indicative of a malfunction of the optical coupler.

* * * * *